United States Patent [19]

Eguchi

[11] Patent Number: 4,912,389
[45] Date of Patent: Mar. 27, 1990

[54] ROTARY POSITION DETECTOR FOR STEPPING MOTOR

[75] Inventor: Norio Eguchi, Tochigi, Japan

[73] Assignee: Kabushiki Kaisha Universal, Tochigi, Japan

[21] Appl. No.: 279,935

[22] Filed: Dec. 5, 1988

[30] Foreign Application Priority Data

Dec. 4, 1987 [JP] Japan .................... 62-185227[U]

[51] Int. Cl.⁴ ............................................. H02P 8/00
[52] U.S. Cl. .................................. 318/696; 318/685;
318/661; 273/143 R; 250/231.14
[58] Field of Search ............ 318/696, 685, 661;
273/143 R; 250/231 SE

[56] References Cited

U.S. PATENT DOCUMENTS 4,534,560  8/1985  Okada .
4,637,611  1/1987  Hamada ................... 273/143 R
4,687,981  8/1987  Okada .
4,715,604  12/1987 Okada .
4,772,815  9/1988  Harned et al. ............. 318/661 X Primary Examiner—William M. Shoop, Jr.
Assistant Examiner—Saul M. Bergmann
Attorney, Agent, or Firm—Young & Thompson

[57] ABSTRACT

A sector is provided on a rotary shaft of a stepping motor. Two end edges of this sector define two reference positions. When a sensor detects one of the end edges, a reset signal generator generates a reset signal to reset a counter which counts driving pulses for the stepping motor or fractions thereof. The reset signal generator also generates a distinguishing signal representing which end edge of the sector is detected. The rotary position of the stepping motor is determined based on the content of the counter and the distinguishing signal.

18 Claims, 5 Drawing Sheets

ROTARY POSITION DETECTOR FOR STEPPING MOTOR

BACKGROUND OF THE INVENTION

The present invention relates to a rotary position detector for a stepping motor, and more particularly to a rotary position detector for a stepping motor whose rotary position is detected by counting driving pulses for driving the stepping motor or fractions thereof.

As is well known in the art, a stepping motor makes an equi-angular rotation on each reception of a driving pulse. The rotary position or angle of the stepping motor can in theory be precisely obtained by calculation. That is, the amount of rotation is calculated by multiplying the rotary angle per driving pulse by the number of supplied driving pulses which is counted by a counter. However, if a rotary discrepancy called step-out occurs, the actual amount of rotation differs from the amount of rotation measured in the counter.

To eliminate the influence of the step-out of the stepping motor, the counter for counting the number of driving pulses is reset with a reset pulse which is generated every one revolution of the stepping motor. Accordingly, even if there occurs a step-out in one revolution, the actual rotary position in the next revolution can be precisely obtained after the counter is reset.

For obtaining such reset pulse, a signal means is provided on the rotary shaft of the stepping motor or on a rotary member secured to the rotary shaft to produce a reset signal each revolution of the stepping motor, as disclosed in, for instance, U.S. Pat. No. 4,687,981.

In U.S. Pat. No. 4,687,981, there is provided a radially extending light-shielding lug as a signal means on the rotary shaft of a stepping motor or a disc on the rotary shaft with a hole therethrough. When the light-shielding lug or the hole is detected with a photosensor, the photosensor produces a reset signal each revolution of the rotary shaft. The structure for provision of the signal means is simple. However, if the step-out occurs, precise counting of driving pulses and the determination of the rotated position of the stepping motor must be delayed until the counter is reset by a reset signal after, at most, one revolution of the rotary shaft.

In U.S. Pat. No. 4,534,560, four light-shielding plates are provided as signal means, which differ in shape from each other, so as to shorten the time until the counter is reset. The four light-shielding plates are secured to a rotary reel on the motor shaft to define four regions into which the reel is divided. A photosensor produces four kinds of reset signals for resetting the counter. The precise counting of driving pulses and determination of the rotary position of the stepping motor can be done each quarter of a revolution of the stepping motor, utilizing the reset signals. However, the signal means are complicated in shape, and circuitry is necessary for distinguishing the four kinds of signals corresponding to the four signal means.

OBJECTS OF THE INVENTION

It is, therefore, an object of the present invention to provide a rotary position detector which provides two reset signals for resetting a counter during one revolution of the stepping motor with one simple signal means.

It is another object of the present invention to provide a rotary position detector which is able to distinguish between the two reset signals with simple circuitry.

SUMMARY OF THE INVENTION

For achieving those and other objects and advantages, a rotary position detector for a stepping motor is provided with one signal means secured to a driving shaft of a stepping motor or to a rotary member secured to the driving shaft. The signal means has a circumferential extent such that its two end edges define first and second rotary reference positions. Passage of the signal means is detected with a sensor, which generates electrical signals according to detection of the passage and transmits these signals to a reset signal generating means. The reset signal generating means detects a leading edge or trailing edge of the received electric signal to generate reset signals which represent the first and second rotary reference positions. A distinguishing means distinguishes and stores the kind of the reset signals, that is, which rotary reference position the reset signal represents. A counter counts driving pulses for a stepping motor or fractions of a driving pulse. When the reset signal resets the content of the counter, the distinguishing means simultaneously distinguishes the kind of the reset signal.

According to preferred embodiments of the present invention, two reset signals are generated from a reset signal generating means during one revolution of the stepping motor, allowing quick determination of the rotary position without waiting for the next revolution. The signal means is simple in shape and the circuit for distinguishing the rotary reference positions is also simple.

BRIEF DESCRIPTION OF THE INVENTION

DETAILED DESCRIPTION OF THE INVENTION

Figure 1:
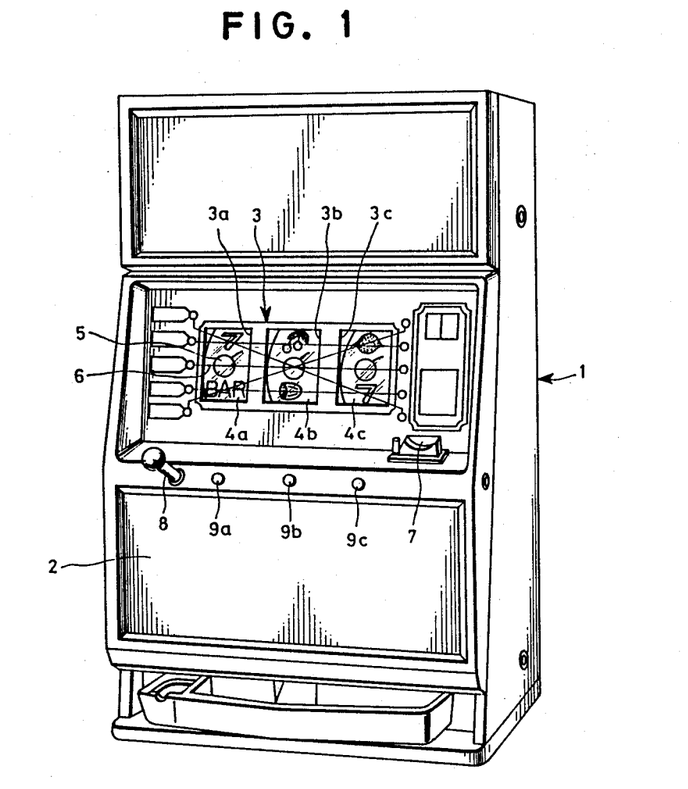
FIG. 1 is a perspective view of a slot machine to which the present invention is applied.

Referring now to the attached drawings, the first and second embodiments of a rotary position detector for a stepping motor according to the present invention will be described in detail. The first embodiment is an example in which the present invention is applied to a stepping motor used in a slot machine. For easy understanding of the present invention and the embodiments, firstly a typical slot machine will be briefly described with reference to FIG. 1. Numeral 1 designates a slot machine to the front of which a front panel 2 is pivotally attached. In the upper portion of the front panel 2, a symbol indicating section 3 is provided, which has three symbol displaying windows 3a, 3b and 3c side by side. Through the windows 3a, 3b and 3c, reels 4a, 4b and 4c with symbols 5 on the peripheral surface are viewed. In this type of slot machine, three symbols 5 in a vertical row appear through each window 3a to 3c. Prize-winning lines 6 are marked on the symbol displaying section 3, three lines horizontally and two lines diagonally. A coin slot 7 and a start lever 8 are also provided on the symbol displaying section 3. The number of the effective prize-winning lines is selected according to the number of coins inserted into the coin slot. When a player inserts coins into the coin slot and then pulls the start lever 8, the reels 4a, 4b and 4c start to rotate all together. Numerals 9a, 9b and 9c designate stop buttons which are depressed to stop the rotations of the reels 4a, 4b and 4c respectively by the player. The decision as to whether the three symbols 5 under one of the prize-winning lines is worthy of a prize or not is made automatically by a microcomputer incorporated in the slot machine 1. For this purpose, the symbols under the lines must be precisely identified by a microcomputer.

Figure 2:
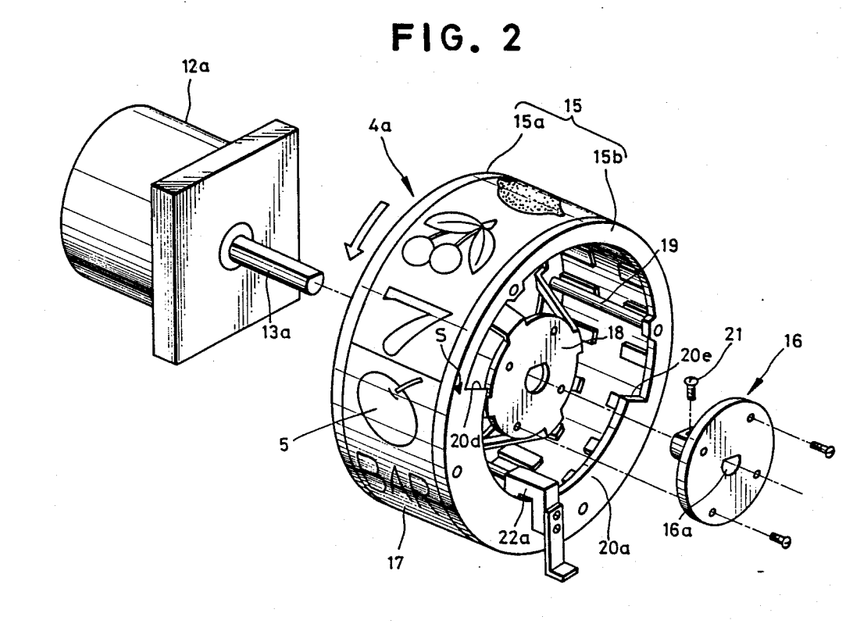
FIG. 2 is an exploded perspective view of essential parts of an embodiment wherein the present invention is applied to a stepping motor for driving a reel of a slot machine shown in FIG. 1.
Figure 3:
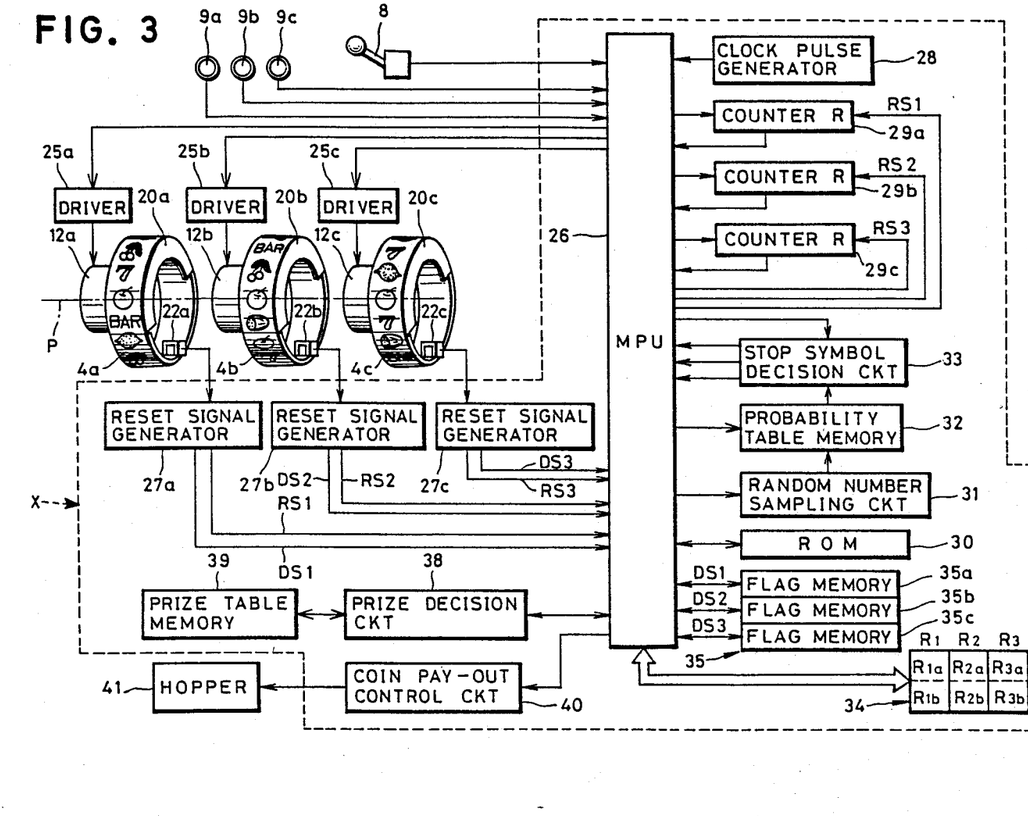
FIG. 3 is a schematic block diagram of a circuit of the slot machine of FIG. 2.
Figure 4:
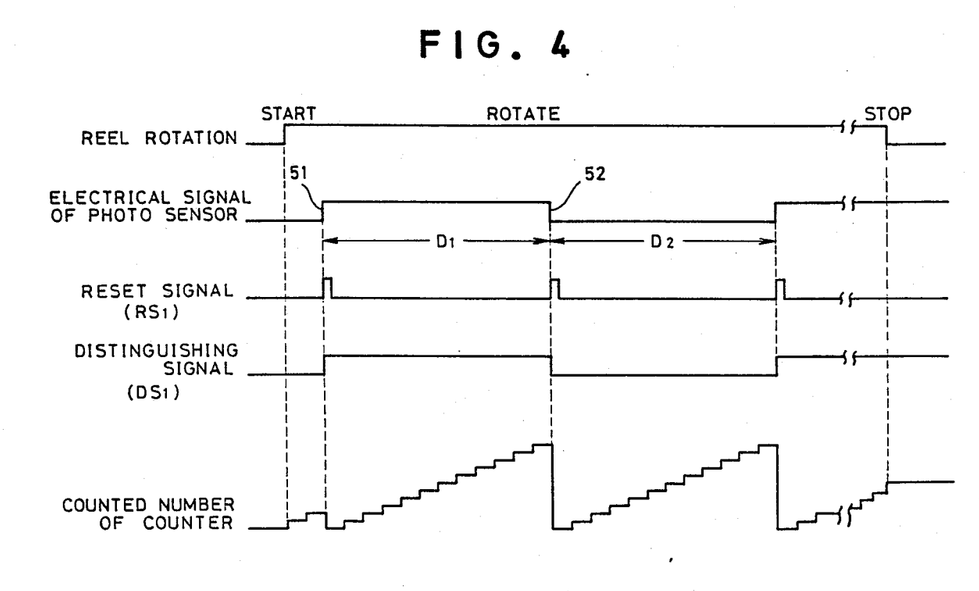
FIG. 4 is a time chart of waveforms showing the operation of the circuit of FIG. 3.

Referring now to FIGS. 2 to 4, the first embodiment of the present invention applied to a reel will be described. Numeral 12a designates a stepping motor which drives the first reel 4a of the slot machine 1 through a driving shaft 13a thereof. The first reel 4a secured to the driving shaft 13a comprises a reel body 15, and a coupling plate 16, and a symbol strip 17. The coupling plate 16 securely connects the first reel 4a to the driving shaft 13a with fixing screws so as to drive the first reel 4a. The symbol strip 17 is made of a flexible plastic strip with symbols 5 and is wound around the periphery of the reel 4a. Each of the symbols 5 is provided on the strip with a predetermined spacing. The reel body 15 comprises a pair of reel frames 15a and 15b, a bridge 18 and connecting rods 19. The reel frame 15a and the bridge 18 are made of plastic material and integrally formed. The reel frame 15b is also made of plastic material and is formed integrally with a light-shielding section 20a. The reel frames 15a, 15b are securely connected to each other by the connecting rods 19.

The assembling of the reel 4a is carried out as follows: the coupling plate 16 is attached to the reel body 15 with screws. The driving shaft 13a is inserted into a fixing hole 16a defined in the coupling plate 16 and then the first reel 4a is secured to the driving shaft 13a with a screw 21. Because flattened portions are formed in the driving shaft 13a, the fixing hole 16a, the bridge 18, and a projecting portion of the coupling plate 16 as shown in FIG. 2, are fixed to each other with a predetermined angular relationship.

A light-shielding section 20a extends circularly inside the reel frame 15b around half of its circumference. A generally U-shaped photosensor 22a is disposed astride the light-shielding section 20a. The sensor 22a comprising light-emitting means and light-receiving means detects the passage of the light-shielding section 20a, but the sensor 22a does not interfere with the free rotation of the light-shielding section 20a. When the reel 4a is rotated counterclockwise in FIG. 2 by the stepping motor 12a, an electric signal generated by the photosensor 22a rises upon detecting one end edge 20d of the light-shielding section 20a and falls upon detecting the other end edge 20e. When the reel 4a rotates by half of one revolution from any position, the photosensor 22a necessarily detects the end edge 20d or 20e. The end edges 20d and 20e define the first and second rotary reference positions described before. The most preferable angular extent of the light-shielding section 20a is 180°. The angle, however, may have other values, for example, 150° or 250°.

A locator mark S is provided at a position just beside the end edge 20d of the light-shielding section 20a. On the basis of the position of the mark S, the symbol strip 17 is secured to the peripheral surface of the reel 4a. Accordingly, the rotary position of the driving shaft 13a, the angular position of the light-shielding section 20a, and the position of each symbol on the symbol strip 17 are in a definite relation to each other. Therefore, the three symbols viewed in the symbol displaying window 3a are correctly identifiable by detecting the rotary position of the stepping motor 12a. The second and third reels 14b and 4c have the same structures and arrangements as the first reel 4a except for the kind and order of the symbols provided on the respective symbol strips.

In FIG. 3 showing a schematic diagram of a slot machine, the part enclosed by a broken line X comprises a microcomputer incorporated in a slot machine. The stepping motor 12 driving the first reel 4a is connected to a microprocessor unit 26 (hereinafter MPU) through a driver 25a. Similarly, stepping motors 12b and 12c driving the second and third reels 4b and 4c are connected to the MPU 26 through drivers 25b and 25c. The photosensor 22a detecting the passage of the light-shielding section 20a is connected to a reset signal generator 27a. Similarly, photosensors 22b and 22c detecting the passage of light-shielding sections 20b and 20c are connected to reset signal generators 27b and 27c.

The reset signal generates 27a to 27c include respective differentiation circuits, encoders and pulse generators. The differentiation circuits differentiate electrical signals obtained by photoelectric conversion by the photosensors 22a to 22c. Each encoder distinguishes whether the output from the respective differentiation circuit is positive or negative, and generates a digital distinguishing signal DS whose level is changed, for example between "0" or "1" as shown in FIG. 4, according to whether the output of the differentiation circuit is positive or negative. Each pulse generator generates a reset signal RS having level "1" as shown in FIG. 4, every time the corresponding differentiation circuit outputs a signal. The reset signal generators 27a to 27c generate reset signals RS1 to RS3 and transmit these signals to the MPU 26 upon each reception of the outputs of the differentiation circuits. Each output of each differentiation circuit corresponds to the leading or trailing edge of the corresponding electrical signal. Namely, the differentiation circuit ouputs a positive pulse upon detecting a leading edge 51 (see FIG. 4) and a negative pulse upon detecting a trailing edge 52. Each generator 27a, 27b, 27c further generates a distinguishing signal DS1, DS2, DS3 which in turn is sent to the MPU 26. The distinguishing signal DS1, DS2, DS3 serves to decide which edge of the electrical signal provided by the sensor 22a, 22b, 22c, leading or trailing, each reset pulse represents. Instead of encoders, flip-flops may be used.

Figure 5:
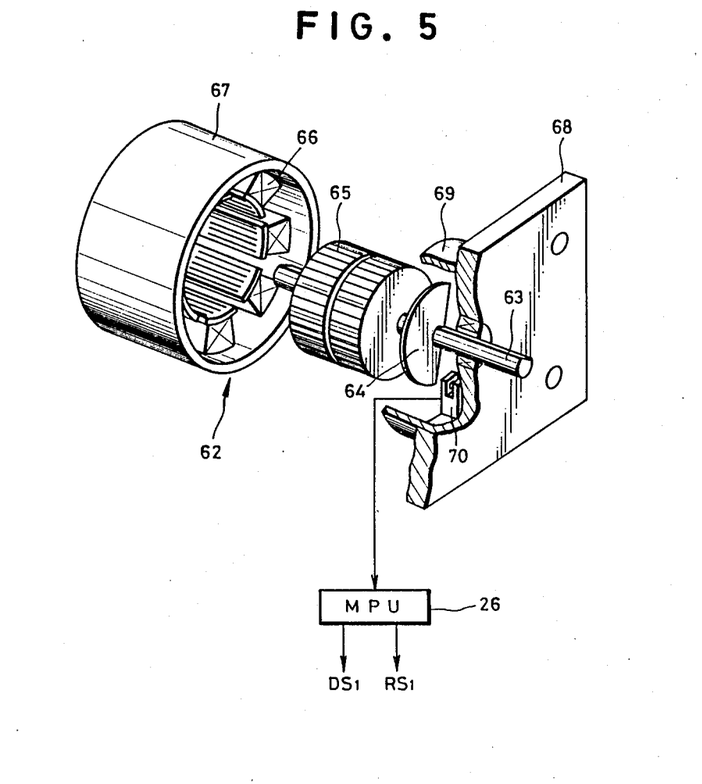
FIG. 5 is an exploded perspective view of essential parts of another embodiment of the present invention.

In this embodiment, the MPU 26 may distinguish change of the signals DS1 to DS3 to generate the reset signals RS1 to RS3 because the kinds of distinguishing signals are two in number. In this case, the reset signal generators 27a to 27c are provided with a single output line as shown in FIG. 5 because the distinguishing signals DS1 to DS3 substantially include the reset signals RS1 to RS3.

The MPU 26 outputs driving pulses from clock pulses supplied from a clock pulse generator 28 so as to feed driving pulses to the drivers 25a, 25b and 25c. For counting the number of the driving pulses supplied to the drivers 25a to 25c, counters 29a to 29c are provided respectively. The counted numbers in the counters 29a to 29c are fed back respectively to the MPU 26. When a reset pulse RS is supplied to a reset terminal of the counters 29a to 29c from the MPU 26, the content of each counter 29a to 29c is reset to zero. Although each counter 29a to 29c counts the number of the driving pulses in this embodiment, the counters 29a to 29c may also count the number of fractional pulses obtained by division of the driving pulses in order to cause the counted number to correspond directly to the symbols on the center prize-winning line P.

A ROM 30 storing a program controls the processes of the MPU 26 corresponding to the stage of progress of a game, and also controls the stoppage of the stepping motors 12a to 12c. Upon operation of the start lever 8 by a player, a random number sampling circuit 31 samples a random number. A probability table memory 32 stores a table in which numbers are divided into ranges according to pay-out rate, namely, the number of coins to be paid. The sampled random number is judged as to the range to which the sampled random number belongs, that is, the sampled number is judged as to whether the number represents a fail, a small hit, a middle hit, or a big hit.

A stop symbol decision circuit 31 decides a combination of symbols corresponding to the judgment on the probability table memory 32. For instance, when a sampled random number corresponds to a big hit such as "Jackpot", the stop symbol decision circuit 31 controls the stop positions of the reels 4a to 4c in such a way that the symbols representing the "Jackpot" are stopped on a prize-winning line.

A symbol table memory 34 is made up of a ROM and divided into three memory areas $R_1$, $R_2$ and $R_3$ which store symbol codes representing the symbols in the order of address according to the arrangement of the symbols provided on the reels 4a, 4b and 4c. The memory areas $R_1$, $R_2$ and $R_3$ are further divided into memory areas $R_{1a}$, $R_{1b}$, $R_{2a}$, $R_{2b}$, $R_{3a}$ and $R_{3b}$. Stored in the first address of the memory area $R_{1a}$ is a symbol code representing a symbol which is present on the center prize-winning line P when the one end edge 20d is detected by the photosensor 22a. Similarly, stored in the first address of the memory area $R_{1b}$ is a symbol code representing a symbol which is present on the center prize-winning line P when the other end edge 20e is detected by the photosensor 22a.

Flag memories 35 store the distinguishing signals DS1 to DS3, as flags, from the reset signal generators 27a, 27b and 27c through the MPU 26. For instance, when the MPU 26 receives the reset signal RS, the flag bit "1" is set in the flag memory 35a if distinguishing signal DS1 is "1". By using the distinguishing signals DS1 to DS3, the memory areas $R_{1a}$, $R_{1b}$ can be selected, omitting the flag memory 35.

A prize decision circuit 38 verifies the combination of symbols on the center prize-winning line P as to whether the combination coincides with the combination decided by the stop symbol decision circuit 33 or not. Connected to the prize decision circuit 38 is a prize table memory 39 which stores combinations of the symbol codes worthy of prizes and the numbers of coins to be paid out corresponding to the kind of the prizes. A coin pay-out control circuit 40 instructs a hopper 41 to pay coins according to instructions from the MPU 26 when the game is a success.

The function of the slot machine as constructed above will be described as follows, with reference to FIGS. 3 and 4. To start a game, a coin or coins are inserted into the coin slot. According to the number of inserted coins, an effective prize-winning line or lines are designated. For simplicity, assume hereinafter that the center prize-winning line P is chosen. Upon coin insertion, the lock of the start lever 8 is released. When the start lever 8 is operated, the reels 4a to 4c start to rotate all together. At the same time, a random number is sampled by the random number sampling circuit 31. The number is referred to the data stored in the probability table memory 32 to decide whether the game is to be a success or not, and if a success, what kind of prize is won.

By the time the reels 4a to 4c make a half revolution respectively, the leading or trailing edge of the electrical signals from the photosensors 22a to 22c are detected by differentiating the electric signals as described above. Then, the reset signals RS are generated by the reset signal generators 27a to 27c and sent to the MPU 26 so as to reset the corresponding counters 29a to 29c to zero. While the reels 4a to 4c continue to rotate, the counters 29a to 29c count the number of the driving pulses. The reset signal generators further generate the distinguishing signals DS1 to DS3 by distinguishing the leading edge and trailing edge of the electrical signals from the photosensors 22a to 22c. When one of the distinguishing signals, for example, DS1 is "1", corresponding flag memory 35a is set to "1". At the time that the reels 4a to 4c make a further half revolution from the time that the leading or trailing edges are detected, the counters 29a to 29c are reset again and the flag memory 35a to 35c is set to be "0". It is to be noted that the detection of the leading and trailing edges 51, 52 of the electrical signals is the detection of the one or the other end edge 20e, 20d of the light shielding section 20a, defining one of the rotary reference positions described above.

FIG. 4 is a time chart of the rotation of the reel 4a, the electric signals, the reset signal RS1, the distinguishing signal DS1, and the number counted by the counter 29a. The photosensor 22a outputs an electric signal while detecting a light-shielding section 20a on the reel 4a. Each duration $D_1$ and $D_2$ corresponds to the time for half of one reel revolution. The reset signals RS1 are sent to the counter 29a upon detection of the leading or trailing edge 51 or 52 of the electrical signal by differentiating the electric signal by a differentiating circuit in the reset signal generator 27a. The period of the reset signal RS1 also corresponds to the time for half of one reel revolution. Hence, the counter 29a starts to count from zero upon each reception of a reset signal RS1 as shown. The distinguishing signal DS1 is also transmitted to the flag memory 35a by the MPU 26 from the reset signal generator 27a.

In this way, as the counters 29a to 29c are reset each half revolution of the reels 4a to 4c, the rotary position after this reset is precisely determined despite the fact that a step-out of the stepping motors 12a to 12c might have occurred. Judging the contents of the flag memories 35a to 35c and the counters 29a to 29c, the MPU 26 identifies the symbols on the center prize-winning line P based on the symbol table memory 34. For example, as to the reel 4a, when the content of the flag memory 35a is "1", the memory area $R_{1a}$ of the symbol table memory 34 is selected and one address of the memory area $R_{1a}$ is specified according to the content of the counter 29a. A symbol code stored in the specified address is read out. Thus, the symbols under the center prize-winning line P can be identified. On the other hand, when the content of the flag memory 35a is "0", the memory area $R_{1b}$ is selected.

After that, when one of the stop buttons 9a to 9c, for example, the stop button 9a is depressed by a player, the stop symbol decision circuit 33 starts to operate according to the operational timing of the stop button 9a and controls the stoppage of the stepping motor 12a in such a way that the combination of symbols determined by the probability table memory 32 is displayed on the center prize-winning line P. For this purpose, based on the counted number in the counter 29a and the flag in the flag memory 35a, the symbol codes stored in the memory area $R_{1a}$ or $R_{1b}$ of the symbol table memory 34 are referred to and then a symbol to be displayed on the center prize-winning line P is decided. To satisfy this requirement, the rotation of the stepping motor 12a is controlled.

In the same way, as to the second and third reels 4b and 4c, according to the operational timing of the stop buttons 9b and 9c, and the flag memory 35b and 35c, based on the counted numbers in the counters 29b and 29c, the symbol codes stored in the memory areas $R_{2a}$, $R_{2b}$, $R_{3a}$ and $R_{3b}$ are referred to and then symbols to be displayed on the center prize-winning line P are decided. To satisfy this requirement, the rotations of the stepping motors 12b and 12c are controlled.

When the stepping motors 12a to 12c and the reels 4a to 4c connected thereto are stopped as described above, the symbol codes in the symbol table 34 are referred to based on the counted numbers in the counters 29a to 29c and the content in the flag memory 35a, and then the combination of symbols on the center prize-winning line P is checked by the prize decision circuit 38 for confirmation. If the combination of the symbols is worthy of a prize, coins whose number corresponds to the kind of the prize are paid out through the pay-out control circuit 40 and the hopper 41. Then one game is terminated.

Since the slot machine is so controlled as described above, only a time corresponding to half of one revolution can be a dead time before an actual control of the stepping motor.

FIG. 5 shows the second embodiment of the present invention. This embodiment has a light-shielding sector 64 which is attached to a driving shaft 63 of a stepping motor 62. To the driving shaft 63, also a rotor 65 made of a permanent magnet is attached. These components, the stepping motor 62, the driving shaft 63, the semi-circular light-shielding sector 64, and the rotor 65 are encased in a housing 67 having stators 66 which, with rotor 65, comprise a coil and a core, respectively. Secured on a base plate 68 is a supporting cylinder 69 fitted into the housing 67. On the inner wall of the supporting cylinder 69, a photosensor 70 is fixed. The light-emitting part and light-receiving part of the photosensor 70 are disposed, facing each other, with the rotary plane of the circular light-shielding sector 64 therebetween, so as to detect the passage of the light-shielding sector 64 photoelectrically. The output of the photosensor 70 is sent to the MPU 26. The MPU 26 continuously scans the output of the photosensor 70 during the rotation of the motor 62 and generates reset signals RS when the output of the photosensor 70 changes in level. The MPU 26 further generates distinguishing signal DS according to the state of the level change of the output of the photosensor 70. That is, the MPU 26 substantially comprises a reset signal generator.

Because the light-shielding sector 64 is incorporated in the stepping motor 62 in this way, the light-shielding sector 64 will be protected from breaking upon the assembly of the stepping motor into, for example, a slot machine. As before, the opening angle of the light-shielding sector 64 is not limited to 180°. This angle may be more or less than 180°. The same function can be obtained by providing a semi-circular slit defined in a light-shielding disk secured to the driving shaft 51, instead of the light-shielding sector 64.

In both of the embodiments described above, electric signals supplied to reset signal generators are photoelectrically produced by photosensors. Instead of this, however, a magnetic sensor or proximity sensor may be used to obtain electrical signals by detecting the passage of signal means secured to a driving shaft or to a rotating member secured to a driving shaft. In this case, suitable signal means is used according to the kind of the sensor to be used.

Obviously many other modifications and variations of the present invention are possible in the light of the above teachings. It is therefore to be understood that within the scope of the claims the invention may be practiced otherwise than as specifically described.

What is claimed is:

1. In a rotary position detector which has a counter that counts driving pulses for driving a stepping motor or fractions thereof, and means to reset said counter by a reset signal; the improvement comprising:

signal means which rotates upon rotation of a driving shaft of a stepping motor, said signal means having a circumferential length such that leading and trailing end edges of said signal means define first and second rotary reference positions;

a sensor for detecting passage of said signal means and for generating electric signals according to detection of said passage;

means for generating reset signals upon detecting a said end edge of said electrical signals and for generating distinguishing signals for discriminating between said reference positions; and means for determining the rotary position of said stepping motor by reference to the contents of said counter and said distinguishing signals.

2. A rotary position detector for a stepping motor as defined in claim 1, wherein said signal means is secured to said driving shaft.

3. A rotary position detector for a stepping motor as defined in claim 1, wherein said signal means is secured to a rotating member which rotates with said driving shaft.

4. A rotary position detector for a stepping motor as defined in claim 1, wherein said first and second rotary reference positions are spaced apart 180°.

5. A rotary position detector for a stepping motor as defined in claim 4, wherein said signal means has a semicircular shape.

6. A rotary position detector for a stepping motor as defined in claim 2, wherein said signal means is semicircular and incorporated in said stepping motor.

7. A rotary position detector for a stepping motor as defined in claim 3, wherein said rotating member is a reel of a slot machine and is provided with symbols on a peripheral surface of the reel at a regular spacing.

8. A rotary position detector for a stepping motor as defined in claim 1, wherein said sensor comprises a light-emitting means for emitting light and a light-receiving means for receiving said light and for generating said electric signals.

9. A rotary position detector for a stepping motor as defined in claim 8, wherein said signal means is a light-shielding member and passes between said light-emitting means and said photosensor.

10. In a rotary position detector which has a counter that counts driving pulses for driving a stepping motor or fractions thereof, and means to reset said counter by a reset signal; the improvement comprising:

signal means which rotates upon rotation of a driving shaft of a stepping motor, said signal means having a circumferential length such that leading and trailing end edges of said signal means define first and second rotary reference positions;

a sensor for detecting passage of said signal means and for generating electric signals according to detection of said passage;

means for generating reset signals upon detecting a said one edge of said electrical signals and for generating distinguishing signals for discriminating between said reference positions;

means connected with said generating means for storing said distinguishing signals; and means for determining the rotary position of said stepping motor by reference to the contents of said counter and said storing means.

11. A rotary position detector for a stepping motor as defined in claim 10, wherein said signal means is secured to said driving shaft.

12. A rotary position detector for a stepping motor as defined in claim 10, wherein said signal means is secured to a rotating member which rotates with said driving shaft.

13. A rotary position detector for a stepping motor as defined in claim 10, wherein said first and second rotary reference positions are spaced apart 180°.

14. A rotary position detector for a stepping motor as defined in claim 13, wherein said signal means has a semi-circular shape.

15. A rotary position detector for a stepping motor as defined in claim 11, wherein said signal means is semi-circular and incorporated in said stepping motor.

16. A rotary position detector for a stepping motor as defined in claim 12, wherein said rotating member is a reel of a slot machine and is provided with symbols on a peripheral surface of the reel at a regular spacing.

17. A rotary position detector for a stepping motor as defined in claim 10, wherein said sensor comprises a light-emitting means for emitting light and a light-receiving means for receiving said light and for generating said electric signals.

18. A rotary position detector for a stepping motor as defined in claim 17, wherein said signal means is a light-shielding member and passes between said light-emitting means and said photosensor.

* * * * *